(12) United States Patent
Maikuma (10) Patent No.: US 6,542,337 B2
(45) Date of Patent: Apr. 1, 2003

(54) HARD DISK APPARATUS

(75) Inventor: Masahiro Maikuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/998,264

(22) Filed: Nov. 30, 2001

(65) Prior Publication Data

US 2002/0071221 A1 Jun. 13, 2002

(30) Foreign Application Priority Data

Dec. 7, 2000 (JP) ........................................ 2000-372750

(51) Int. Cl.[7] .............................................. G11B 5/596
(52) U.S. Cl. .................................................. 360/294.4
(58) Field of Search ........................... 360/294.1–294.7

(56) References Cited

U.S. PATENT DOCUMENTS 6,301,080 B1 * 10/2001 Boutaghou ............... 360/294.4
6,331,923 B1 * 12/2001 Mei ........................ 360/294.4
6,335,848 B1 * 1/2002 Mei ........................ 360/294.4
6,335,849 B1 * 1/2002 Khan et al. ............... 360/294.4
6,404,600 B1 * 6/2002 Hawwa et al. ........... 360/294.4

* cited by examiner

*Primary Examiner*—Allen Cao
(74) *Attorney, Agent, or Firm*—Jay H. Maioli (57) ABSTRACT

A hard disk apparatus wherein one of two second actuators is expanded and the other is simultaneously contracted to bend a supporting member in a width direction orthogonal to a length direction of the supporting member to generate a displacement and a vibration of the supporting member in the direction orthogonal to the length direction. When a smooth surface of a magnetic head sticks to a record surface of a magnetic disk, the magnetic head receives a force in the width direction of the supporting member in a plane substantially parallel to the record surface by the expansion and contraction operation of the second actuators to reduce the sticking between the magnetic head and the record surface.

14 Claims, 5 Drawing Sheets

HARD DISK APPARATUS

CROSS REFERENCE TO RELATED APPLICATIONS

This application claims priority from Japanese Priority Document No. 2000-372750, filed on Dec. 7, 2000 with the Japanese Patent Office, which document is hereby incorporated by reference.

BACKGROUND OF THE INVENTION

1. Field of the Invention

The present invention relates to a hard disk apparatus that is structured such that sticking of a magnetic head thereof to a record surface of a magnetic disk is prevented by providing additional actuator on a support member for the magnetic head.

2. Description of the Related Art

A hard disk apparatus performs recording and reproduction of information to or from a record surface of a magnetic disk as a recording medium while rotating the magnetic disk and moving a magnetic head along a radial direction of the magnetic disk.

When the magnetic head touches the record surface of the magnetic disk while the rotation of the magnetic disk is stopped, so-called sticking phenomenon such that the magnetic head sticks to the record surface of the magnetic disk occurs. The smoother the record surface of the magnetic disk is formed, the more conspicuous the sticking phenomenon becomes.

When the magnetic disk starts to rotate while the magnetic head is sticking to the record surface of the magnetic disk, there is a possibility that either the magnetic head or the record surface of the magnetic disk is damaged, or that the magnetic disk becomes impossible to rotate.

In recent years, as the high density recording of magnetic disks becomes popular, it becomes necessary to improve smoothness of the record surface of the magnetic disk for high density recording. In order to obtain enough smoothness of the record surface of the magnetic disk, the material of a disk substrate has been changed from an aluminum substrate to a glass substrate. In this case, it is performed that the record surface of the magnetic disk is divided into a record area in which information is recorded and an exclusive area on which the magnetic head is placed at the time when the magnetic disk is stopped its rotation, and accordingly the surface of the magnetic disk at the exclusive area is formed to be relatively rough for preventing the sticking phenomenon of the magnetic head to the record surface of the magnetic disk at the time when the magnetic disk is stopped its rotation.

Moreover, as another technique for preventing the sticking phenomenon of the magnetic head, it is proposed to provide a structural mechanism for separating the magnetic head compulsively from the record surface of the magnetic disk in a direction orthogonal to the record surface at the time when the magnetic disk is stopped its rotation.

However, in the case where the exclusive area is formed on the magnetic disk, there is a problem at first such that it is difficult to manufacture such magnetic disk to have different degrees of surface roughness between the exclusive area thereof and the recording area thereof without any difference in thickness. Moreover, secondly, because the quantity of the floatation of the magnetic head above the record surface has to be decreased as the recording density of the magnetic disk becomes increased, there is the possibility that fine dust is generated in the exclusive area, namely in the area in which the degree of surface roughness is increased, when the magnetic head tentatively collides with the record surface of the exclusive area of the magnetic disk during the rotation of the magnetic disk.

Moreover, by the aforesaid technique to provide the structural mechanism for separating the magnetic head from the record surface, the structure of the structural mechanism is complicated and the cost thereof is getting high. Moreover, there is also the possibility that the magnetic head collides with the record surface of the magnetic disk to damage each other when the magnetic head is moved by the structural mechanism.

SUMMARY OF THE INVENTION

The present invention was made in view of such actual circumstances, one of aspects of the present invention is to provide a hard disk apparatus having no necessity of forming an exclusive area, which is difficult to produce, for placing a magnetic head on a magnetic disk, and capable of preventing the generation of fine dust, and being simple in structure and cheap in cost, and further having no possibility of damaging the magnetic head and the magnetic disk.

According to the present invention, a hard disk apparatus comprises: a magnetic disk; a magnetic head for recording and/or reproducing data to/from the magnetic disk; a bendable support member for supporting the magnetic head; a first actuator coupled to the bendable support member for moving the magnetic head in a redial direction of the magnetic head; and a second actuator mounted in the mid portion of the bendable support member for moving the magnetic head independent on the first actuator.

More specifically, the present invention relates to a hard disk apparatus which comprises: a magnetic disk having a record surface where information is recorded or reproduced while rotating; a magnetic head for recording and reproducing the information on the record surface; a bendable supporting member having a length, wherein the supporting member supports the magnetic head at a tip of the supporting member; a first actuator connected with a base part of the supporting member, wherein the first actuator displaces the supporting member in a radial direction of the record surface to shift the magnetic head in the radial direction of the record surface; and two second actuators disposed with a space between each other in a direction orthogonal to the length direction of the supporting member at a position between the tip and the base part of the supporting member, wherein the second actuators expand and contracting in the length direction of the supporting member to shift the magnetic head minutely in the radial direction of the record surface, wherein the supporting member is elastically distorted by an air flow to be generated between the magnetic disk and the magnetic head when the magnetic disk rotates, and thereby the magnetic head is floated from the magnetic disk, and further the supporting member elastically returns when the magnetic disk stops, and thereby the magnetic head is kept to be in a state of contacting the record surface of the magnetic disk, and further the hard disk apparatus expands or contracts the two second actuators to generate displacement or a vibration of the supporting member in the direction orthogonal to the length direction or in the length direction when the magnetic disk starts to shift to its stopping state to its rotation state.

According to the hard disk apparatus of the present invention, even if the magnetic head sticks to the record surface of the magnetic disk when the magnetic head contacts the recording surface of the magnetic disk, the hard disk apparatus generates displacement or a vibration of the supporting member in a direction orthogonal to the length direction or the length direction by expanding or contracting the two actuators, and thereby the state such that the magnetic head sticks to the record surface of the magnetic disk can be released.

Consequently, the hard disk apparatus has no necessity of forming an exclusive area, which is difficult to produce, for placing a magnetic head on a magnetic disk differently from conventional art, whereby the generation of fine dust can be prevented. Moreover, because the hard disk apparatus does not need to be equipped with a complex mechanism for separating the magnetic head from the magnetic disk, the structure of the hard disk apparatus becomes simple to make the cost thereof cheap. Consequently, the hard disk apparatus has no possibility of damaging the magnetic head and the magnetic disk.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 5A and FIG. 5B are explanatory drawings showing the operation of a second embodiment, wherein

DESCRIPTION OF THE PREFERRED EMBODIMENTS

Next, with reference to the attached drawings, details of the embodiments of the present invention are described.

Figure 1:
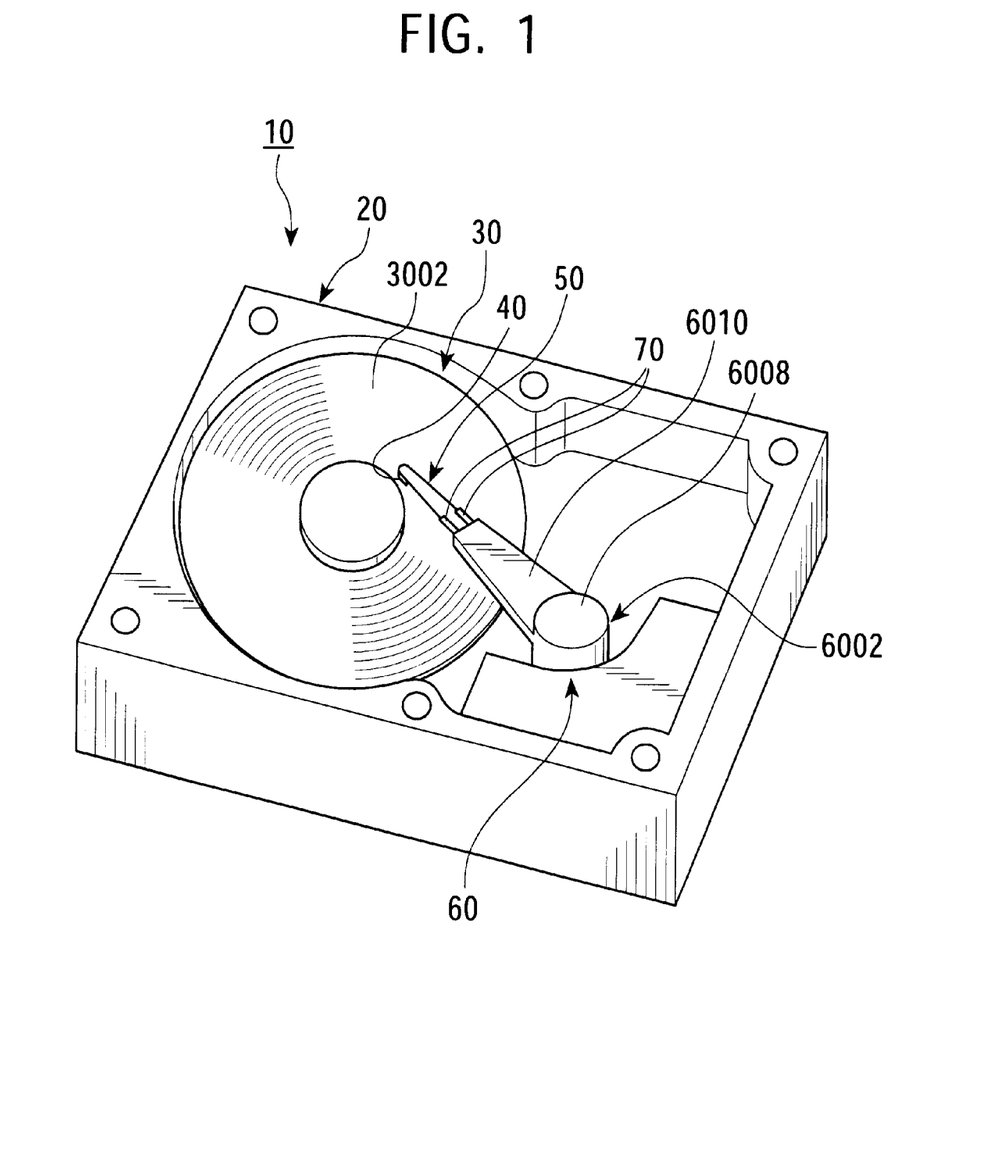
FIG. 1 is a perspective view showing the structure of a hard disk apparatus according to a first embodiment of the present invention.
Figure 2:
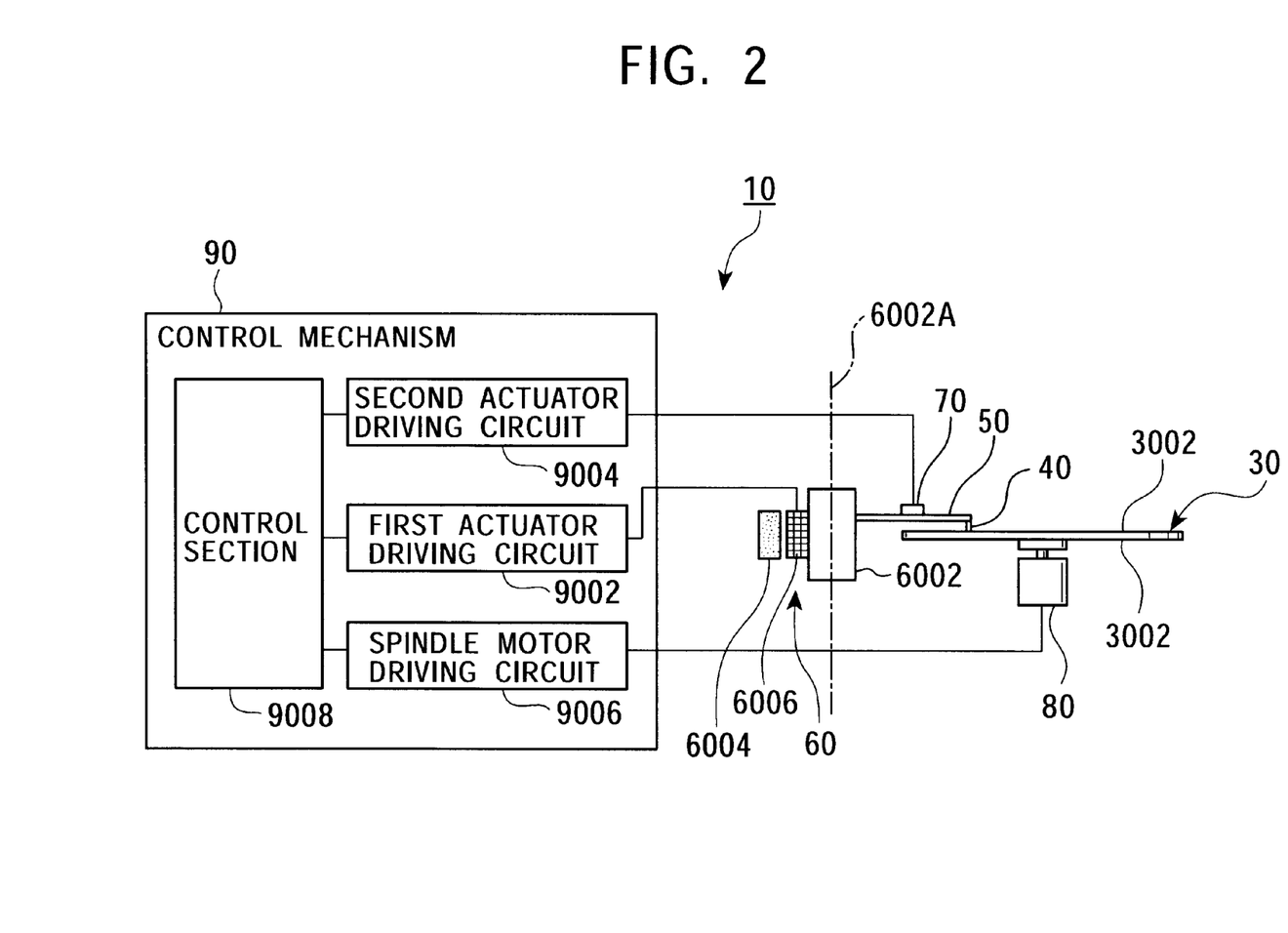
FIG. 2 is a block diagram showing the structure of the control system of the hard disk apparatus.
Figure 3:
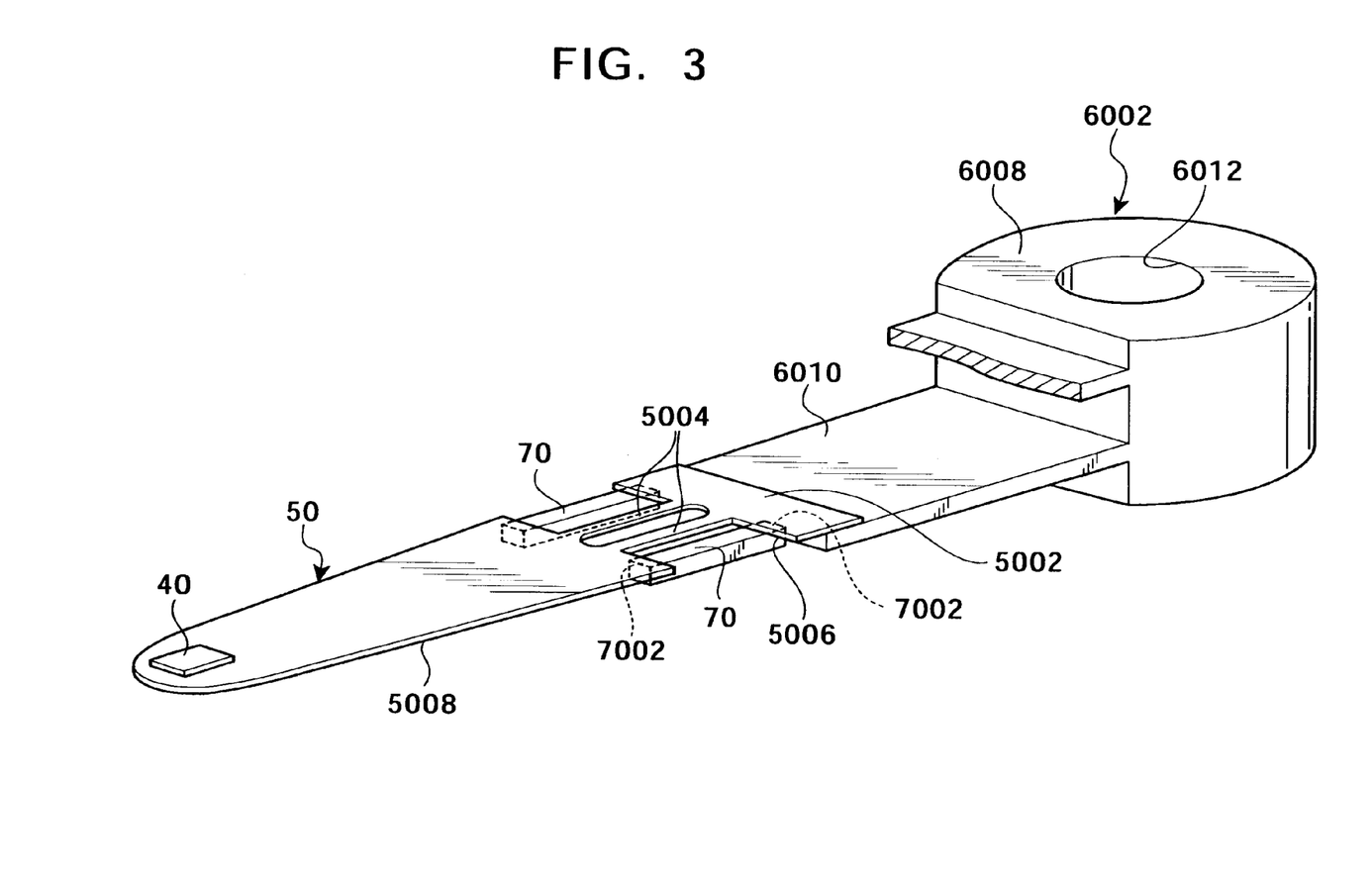
FIG. 3 is a perspective view showing a principal part of the first embodiment.

FIG. 1 is a perspective view showing a structure of a hard disk apparatus according to a first embodiment of the present invention, FIG. 2 is a block diagram showing a structure of a control system of the hard disk apparatus of FIG. 1, and FIG. 3 is a perspective view showing a principal part of the first embodiment.

As shown in FIG. 1 and FIG. 2, a hard disk apparatus 10 is composed of a housing 20, a magnetic disk 30, a magnetic head 40, a supporting member 50, a first actuator 60, two second actuators 70, a spindle motor 80 and a control mechanism 90.

The housing 20 has a rectangle tabular shape with a certain thickness, and houses the magnetic disk 30, the magnetic head 40, the supporting member 50, the first actuator 60, the second actuators 70, the spindle motor 80 and the control mechanism 90 in an inner space thereof.

The magnetic disk 30 is formed in a circular disk having a certain thickness and a diameter. Information signal is recorded and or reproduced on or from record surfaces 3002 formed on both surfaces of the magnetic disk 30. The magnetic disk 30 is driven to rotate by the spindle motor 80. The record surfaces 3002 preferably have flat smooth surfaces.

For simplifying the figure, FIG. 2 shows a structure such that only one set of the magnetic disk 30, the magnetic head 40, the supporting member 50 and the pair of the second actuators 70 are provided. However, practically a plurality of magnetic disks 30 are integrally attached to a drive shaft of the spindle motor 80 at regular intervals in the thickness direction of the magnetic disk 30, and the same numbers of the magnetic heads 40, the supporting members 50 and the pairs of the second actuators 70 as the number of the record surfaces are provided in order to increase recording capacity.

The magnetic head 40 performs the recording and the reproduction of the information while keeping a predetermined gap above the record surface of the rotating magnetic disk 30. The tip surface of the magnetic head 40 that faces the record surface 3002 of the magnetic disk 30 is formed to be a flat smooth surface.

The magnetic head 40 is supported on one end of the supporting member 50, and the other end of the supporting member 50 is connected to the first actuator 60.

The first actuator 60 is connected with the other end of the supporting member 50, and the actuator 60 is structured to move a position of the magnetic head 40 in a radial direction of the record surface 3002 by displacing the supporting member 50 in the radial direction of the record surface 3002.

The first actuator 60 is, as shown in FIGS. 2 and 3, structured as so-called a voice coil motor (VCM) composed of a rotation shaft 6002 rotatable around a rotational center shaft line 6002A which is parallel to a rotational center shaft (not shown) of the magnetic disk 30, a magnet part 6004 fixed on one side of the housing 20, and a coil part 6006 provided on the rotation shaft 6002.

The rotation shaft 6002 is composed of a main body 6008 and a connection piece 6010. In the main body 6008, a bearing hole 6012 into which a shaft part (not shown) is inserted is formed. The rotation shaft 6002 is structured to be rotatable around the rotational center shaft line 6002A by the insertion of the shaft part into the bearing hole 6012.

The connection piece 6010 protrudes from the outer circumference surface of the main body 6008 into the radial direction of the rotational center shaft at regular intervals in the direction of the rotational center shaft line 6002A. The connection piece 6010 is connected with the other ends of the supporting member 50.

The supporting member 50 is structured in order to support the magnetic head 40, and protrudes into a space between the magnetic disk 30 substantially in parallel to the magnetic disk 30.

Figure 4:
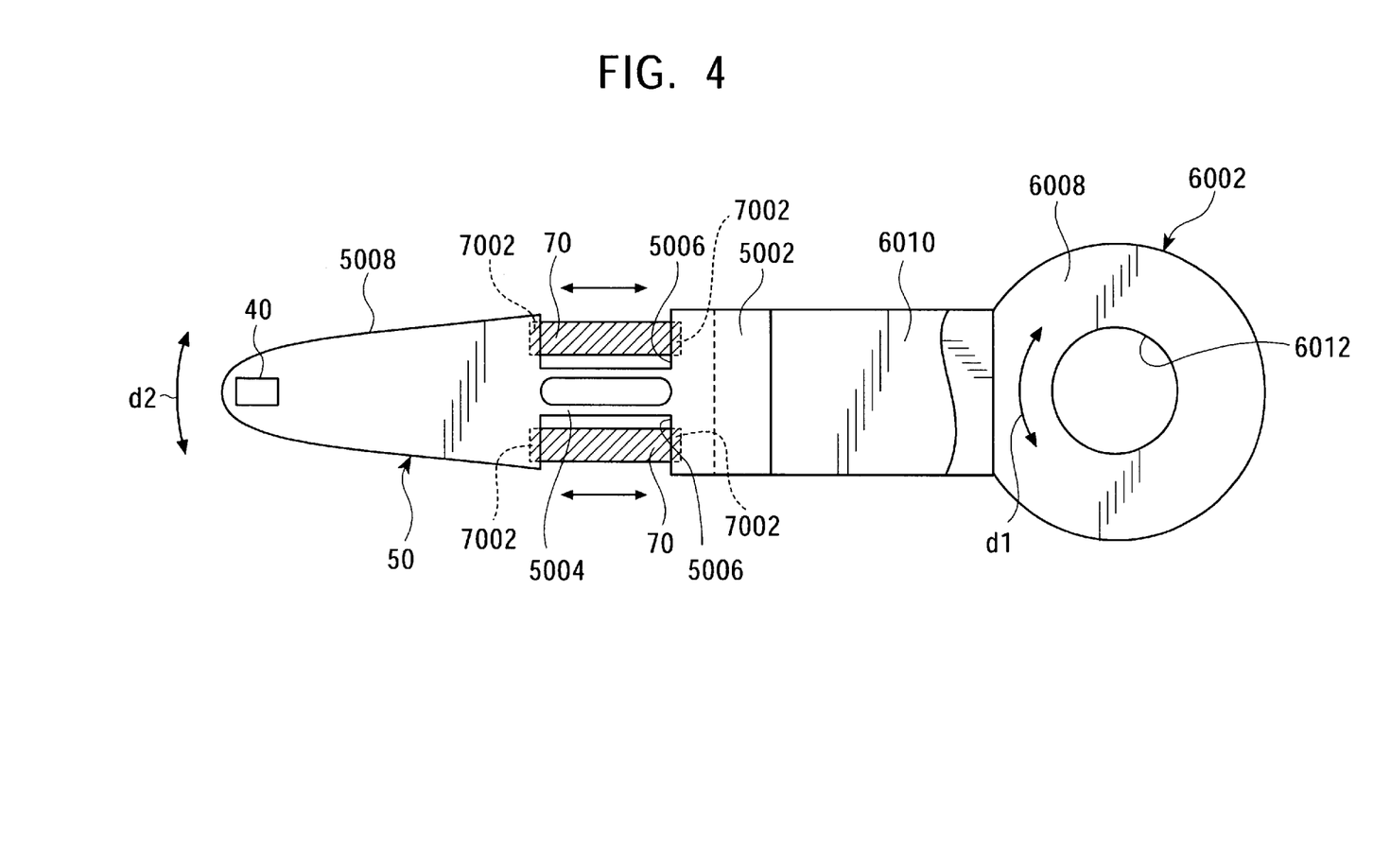
FIG. 4 is a plan view showing the structure of the principal part composed of components such as a magnetic head, a supporting member, a first actuator, and second actuators.

FIG. 4 is a plan view showing a structure of a principal part composed of components such as the magnetic head 40, the supporting member 50, the first actuator 60, and the second actuators 70.

As shown in FIG. 4, the supporting member 50 is formed in a thin plate shape having a proper length, a proper width protruding in a direction orthogonal to the length, and a proper thickness sufficiently smaller than the length.

The supporting member 50 includes a first wide part 5002 (base part) to be connected with the first actuator 60 with, e.g. a screw, a second wide part 5008 (front part) to support the magnetic head 40, a narrow part 5004 for connecting the first and the second wide parts 5002, 5008, in which the narrow part 5004 has a width narrower than those of the first and the second wide parts 5002, 5008, and two notch parts 5006 formed on both sides of the narrow part 5004.

The narrow part 5002 constitutes a spring part structured in order that the supporting member 50. is bendable around the narrow part 5002 as a fulcrum in the width direction orthogonal to the length direction and in the thickness direction.

Incidentally, in the present embodiment, the long hole elongated in the length direction is formed in the narrow part 5002, and thereby the flexibility of the spring part can be increased and the supporting member 50 is made to be easily bent in response to the expansion and the contraction operation of the second actuators 70 which will be described in detail later.

The first actuator 60 is structured to move the position of the magnetic head 40 in the radial direction of the record surface by displacing the supporting member 50 connected with the first actuator 60 in the radial direction of the record surface.

The first actuator 60 is, as shown in FIGS. 2 and 3, structured as so-called the voice coil motor (VCM) composed of the rotation shaft 6002 rotatable around the rotation central shaft line 6002A which is parallel to the rotation central shaft line (not shown) of the magnetic disk 30, the magnet part 6004 fixed on the side of the housing 20, and the coil part 6006 provided on the rotation shaft 6002.

The rotation shaft 6002 is composed of the main body 6008 and the connection piece 6010. In the main body 6008, the bearing hole 6012 into which the shaft part (not shown) is inserted is formed. The rotation shaft 6002 is structured to be rotatable around the rotation central shaft line 6002A by the insertion of shaft part into the bearing hole 6012.

The connection piece 6010 protrudes from the outer circumference surface of the main body 6008 into the radial direction of the rotation central shaft at regular intervals in the direction of the rotation central shaft line 6002A. The connection piece 6010 is connected with the other end of the supporting members 50.

Then, the first actuator 60 is structured such that the rotation shaft 6002 rotates by receiving the driving force around the rotation central shaft line 6002A in response to the driving current supplied to the coil part 6006 from the control mechanism 90 which will be described later.

The two of second actuators 70 are disposed with a space from each other in a direction orthogonal to the length direction on a plane substantially in parallel to the record surface 3002 at positions between the magnetic head 40 and the first actuator 60 of the supporting member 50.

These second actuators 70 are formed as a rectangular parallelepiped having a length, a width and a thickness, and electrodes (not shown) are formed on the second actuators 70. Then, the second actuators 70 are structured to expand and contract in the length direction correspondingly to voltages applied on the electrodes from the control mechanism 90, which will be described alter. The second actuators 70 can be structured by the use of, for example, a piezo-electric device.

The length directions (expansion and contraction directions) of the two second actuators 70 are parallel to the length direction of the supporting member 50, and the two second actuators 70 are attached on the two notch parts 5006 between the fist and the second wide parts 5002, 5008. That is, both the ends 7002 of the respective two actuators 70 in the length direction are attached to the positions of the first and the second wide parts 5002, 5008, and the both ends 7002 of the two second actuators 70 are attached on one of surfaces of the supporting member 50 in the thickness direction thereof.

The spindle motor 80 drives to rotate the magnetic disk 30 around the rotational center axis thereof on the basis of the driving power to be applied by a spindle motor driving circuit 9006, which will be described later, of the control mechanism 90.

The control mechanism 90 is composed of a first actuator driving circuit 9002, a second actuator driving circuit 9004, the spindle motor driving circuit 9006, a control section 9008, and the like.

The first actuator driving circuit 9002 is structured to supply a driving current to the coil part 6006 of the first actuator 60. The second actuator driving circuit 9004 is structured to apply a driving voltage to the two second actuators 70 independently. The spindle motor driving circuit 9006 is structured to supply driving power to the spindle motor 80. The control section 9008 is structured to execute the control of the first actuator driving circuit 9002, the second actuator driving circuit 9004 and the spindle motor driving circuit 9006.

The hard disk apparatus 10 is structured as follows. That is, in an operation stopping state, namely in the state such that the rotation driving of the magnetic disk 30 is stopped, the magnetic head 40 is in a state of touching the record surface 3002 of the magnetic disk 30. When the magnetic disk 30 is driven to rotate, air flow is generated between the magnetic disk 30 and the magnetic head 40. Thereby, the supporting member 50 is elastically deformed to float the magnetic head 40 from the record surface by a minute distance. When the rotation drive of the magnetic disk 30 stops, the supporting member 50 elastically returns to keep the sate such that the magnetic head 40 touches the record surface 3002 of the magnetic disk 30.

Moreover, the positioning operation of the magnetic head 40 of the hard disk apparatus 10 in a radial direction (tracking direction) of the magnetic disk 30 is performed as follows.

That is, as shown in FIG. 4, the control section 9008 controls the first actuator driving circuit 9002 to drive the first actuator 60 in the direction designated by an arrow dl for performing the positioning of the magnetic head 40 in the radial direction (tracking direction) of the magnetic disk 30.

Next, as shown in FIG. 4, the control section 9008 controls the second actuator driving circuit 9004 to expand one of the two second actuators 70 and contract the other of them for bending the supporting member 50 at the narrow part 5004 in the width direction (direction designated by an arrow d2) orthogonal to the length direction to displace minutely. Thereby, the positioning of the magnetic head 40 in the radial direction (tracking direction) of the magnetic disk 30 is performed with a precision finer than that of the positioning by the first actuator 60.

Next, the operation of the hard disk apparatus 10 at the time of shifting from its operation stopping state to its operating state is described.

Before the control section 9008 begins the rotation driving of the spindle motor 80 by the spindle motor driving circuit 9006, the control section 9008 controls the second actuator 9004 to expand one of the two second actuators 70 and to contract the other of them for bending the supporting member 50 in the width direction (direction of the arrow d2)

orthogonal to the length direction to generate the displacement or the vibration of the supporting member 50 in the direction orthogonal to the length direction.

Thereby, in the case where the smooth surface of the magnetic head 40 which smooth surface faces to the record surface 3002 sticks to the record surface 3002, the magnetic head 40 receives a force to the width direction orthogonal to the length direction of the supporting member 50 in a plane substantially parallel to the record surface 3002 of the magnetic disk 30 by the expansion and the contraction operation of the second actuators 70. As a result, the sticking of the magnetic head 40 to the record surface 3002 can compulsively be released.

Next, the control section 9008 controls the spindle motor driving circuit 9006 to rotate the spindle motor 80 for the rotation driving of the magnetic disk 30. Then, the control section 9008 controls the second actuator driving circuit 9004 to stop the expansion and the contraction operations to the second actuators 70 for performing the aforesaid normal positioning operation in the tracking direction.

As described above in detail, according to the first embodiment, in the state such that the magnetic head 40 sticks to the record surface 3002 of the magnetic disk 30, a strong stress operates to the magnetic head 40 by the expansion and the contraction of the second actuators 70, and thereby the release of the sticking and the prevention of the sticking can effectively be performed.

Moreover, when the magnetic head 40 displaces or vibrates in the width direction orthogonal to the length direction in the state such that the magnetic head 40 does not stick, no unnatural forces are generated to the magnetic head 40 and the record surface 3002 of the magnetic disk 30. Consequently, it is of course that the damages of the magnetic head 40 and the magnetic disk 30 do not occur.

Incidentally, in the case where the magnetic head 40 sticks to the record surface 3002 of the magnetic disk 30 when the magnetic disk 30 is stopping and the magnetic head 40 touches the record surface 3002 of the magnetic disk 30, the supporting member 50 is supported by both the magnetic head 40 part and the first actuator 60. In this case, when the frequency of the vibration to be generated in the supporting member 50 is set to be the same as the resonance frequency of the supporting member 50 in the width direction when the supporting member 50 is supported by both the magnetic head 40 part and the first actuator 60, the vibration to be generated in the supporting member 50 can be made to be maximum. Consequently, the sticking of the magnetic head 40 can more effectively be released.

As described above, according to the first embodiment, it is needless to form an exclusive area, which is difficult to produce and is for placing a magnetic head thereon, in a magnetic disk differently from the conventional technique. Thereby, the generation of minute dust can be prevented. Moreover, because it is needless to employ a complex mechanism for separating a magnetic head from a magnetic disk, the hard disk apparatus is simple in structure and cheap in cost, and thereby there is no possibility that the damages of the magnetic head and the magnetic disk occur.

Next, a second embodiment of the present invention is described.

The different point of the second embodiment from the first embodiment is that the control section 9008 controls the two second actuators 70 to perform the expansion and the contraction operation in the same direction at the same time at the time of shifting from the operation stopping state to the operation state.

Figure 5A:
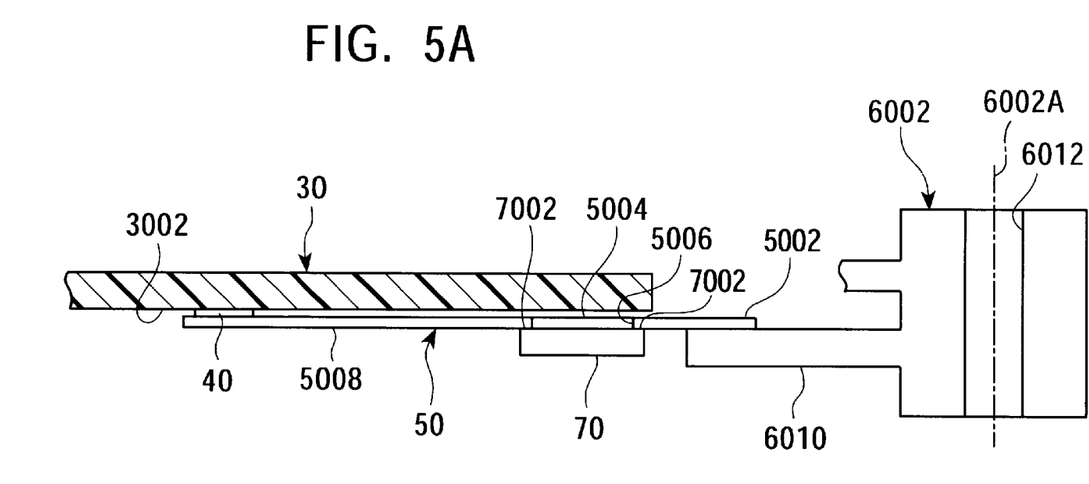
FIG. 5A is a side view in a normal state of the second embodiment.
Figure 5B:
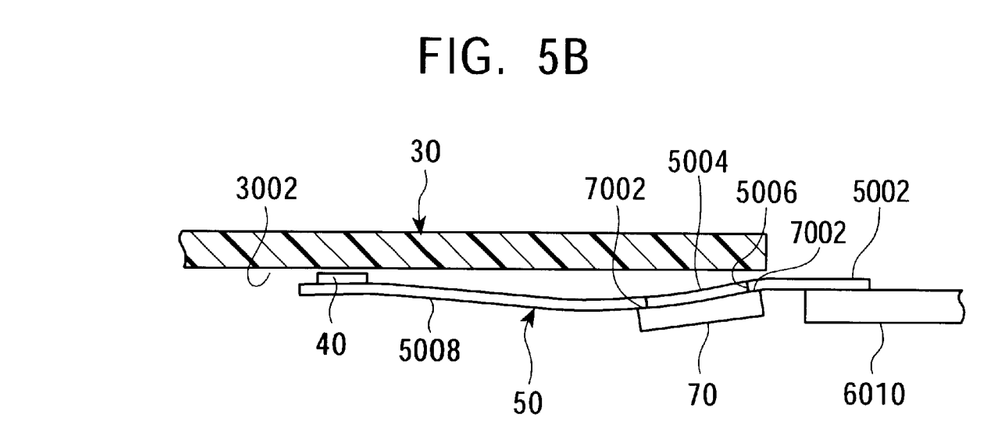
FIG. 5B is a side view of the second embodiment showing a state such that a deflection has occurred in the thickness direction of the supporting member by the drive of the second actuators.

FIG. 5A and FIG. 5B are explanatory drawings illustrating the operation of the second embodiment. FIG. 5A is a side view of a normal state. FIG. 5B is a side view showing a state such that a deflection occurs in the thickness direction of the supporting member by the drive of the second actuators.

As shown in FIG. 5A, it is supposed that the magnetic head 40 touches the record surface 3002 of the magnetic disk 30 in its operation stopping state.

In this state, when the control section 9008 expands or contracts the two second actuators 70 simultaneously, as shown in FIG. 5B, the supporting member 50 deflects in the thickness direction because both the ends 7002 of the two actuators 70 are attached to one of the surfaces of the supporting member 50 in the thickness direction. As a result, the supporting member 50 expands or contracts in the length direction. That is, by the simultaneous expansion or contraction of the two second actuators 70, displacement or vibration of the supporting member 50 in the length direction is generated.

Consequently, if the magnetic head 40 sticks to the record surface 3002 of the magnetic disk 30, the magnetic head 40 receives a force in a plane substantially parallel to the record surface 3002 of the magnetic disk 30 in the length direction of the supporting member 50 by the expansion and the contraction operation of the second actuators 70. Thereby, the sticking of the magnetic head 40 to the record surface 3002 can compulsively be released.

As described above, in the second embodiment, too, the second actuators 70 expand and contract with the magnetic head 40 sticking to the record surface 3002 of the magnetic disk 30, and thereby a strong stress operates to the magnetic head 40. Consequently, the release of sticking can effectively be performed.

Moreover, because the size of the length direction of the supporting member 50 is larger than the size of the width direction thereof, the stiffness in the length direction is stronger than that in the width direction. Consequently, the force operating the magnetic head 40 by the second actuators 70 in the state such that the magnetic head 40 sticks to the record surface 3002 of the magnetic disk 30 is stronger in the second embodiment than in the first embodiment. Hence, the release of the sticking can be performed more efficiently.

Incidentally, if the magnetic head 40 sticks to the record surface 3002 of the magnetic disk 30 when the magnetic disk 30 is stopping and the magnetic head 40 touches the recording surface 3002 of the magnetic disk 30, the supporting member 50 is supported by both of the magnetic head 40 part and the first actuator 60. In this case, as similarly to the first embodiment, when the hard disk apparatus 10 is structured such that the frequency of the vibration to be generated in the supporting member 50 is substantially the same as the resonance frequency of the supporting member 50 in the length direction when the supporting member 50 is supported by both the magnetic head 40 part and the first actuator 60, the vibration to be generated in the supporting member 50 can be made to be maximum. Consequently, the sticking of the magnetic head 40 can more effectively be released.

Moreover, when the magnetic head 40 displaces or vibrates in the length direction in the state such that the magnetic head 40 does not stick, no unnatural forces are generated to the magnetic head 40 and the record surface 3002 of the magnetic disk 30. Consequently, it is of course no damages of the magnetic head 40 and the magnetic disk 30 occur.

Incidentally, in the first and the second embodiments, the frequency of the vibration generated in the supporting member 50 is substantially the same as the resonance frequency of the supporting member 50 in the width direction or the length direction in the state such that the supporting member 50 is supported only by the first actuator 60 like a cantilever.

Moreover, the frequency of the above-mentioned vibration may be swept from a lower frequency side to a higher frequency side or from the higher frequency side to the lower frequency side within a range including a resonance frequency of the supporting member 50 in the width direction or in the length direction in a state of being supported at both ends or one end. In this case, there is an advantage that, even if the resonance frequency of the supporting member 50 is dispersed, the sticking of the magnetic head 40 can effectively be released by resonating the supporting member 50.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A hard disk apparatus comprising:
   a magnetic disk driven to rotate and having a record surface;
   a magnetic head for recording information on and reproducing information from said record surface;
   a bendable supporting member for supporting said magnetic head at an end of said bendable supporting member;
   a first actuator that is connected to a base part of said bendable supporting member and that displaces said bendable supporting member to shift said magnetic head in a radial direction of said magnetic disk; and
   two second actuators disposed adjacently and separated by a spacing in a direction orthogonal to a length direction of said bendable supporting member and located at a position between said end and said base part of said bendable supporting member, wherein
   said second actuators expand and contract along said length direction of said bendable supporting member to shift said magnetic head minutely when said magnetic disk starts said rotation from a stopped state, and wherein
   said bendable supporting member is elastically deformed by an air flow generated between said magnetic disk and said magnetic head to float said magnetic head above said magnetic disk when said magnetic disk rotates; and said bendable supporting member is elastically returned to maintain said magnetic head in contact with said record surface of said magnetic disk when said magnetic disk stops said rotation.

2. A hard disk apparatus comprising:
   a magnetic disk driven to rotate and having a record surface;
   a magnetic head for recording information on and reproducing information from said record surface;
   a bendable supporting member for supporting said magnetic head at an end of said bendable supporting member;
   a first actuator that is connected to a base part of said bendable supporting member and that displaces said bendable supporting member to shift said magnetic head in a radial direction of said magnetic disk; and
   two second actuators disposed adjacently and separated by a spacing in a direction orthogonal to a length direction of said bendable supporting member and located at a position between said end and said base part of said bendable supporting member, wherein
   said second actuators expand and contract along said length direction of said bendable supporting member to shift said magnetic head minutely when said magnetic disk starts said rotation from a stopped state, and wherein
   said bendable supporting member is formed in a thin plate shape having a width in said direction orthogonal to said length direction of said bendable supporting member and a thickness smaller than a length of said bendable supporting member; and
   said second actuators are disposed adjacently and are separated by said spacing in a width direction.

3. The hard disk apparatus according to claim 2, wherein
   said magnetic head sticks to said record surface of said magnetic head when said magnetic disk stops said rotation and said magnetic head contacts said record surface of said magnetic disk;
   said bendable supporting member is supported by said magnetic head and said first actuator; and
   a frequency of a vibration generated by said bendable supporting member is substantially equal to a resonance frequency of said bendable supporting member while supported by said magnetic head and said first actuator in one of said width direction and said length direction.

4. The hard disk apparatus according to claim 2, wherein
   said magnetic head sticks to said record surface of said magnetic head when said magnetic disk stops said rotation and said magnetic head contacts said record surface of said magnetic disk;
   said bendable supporting member is supported by said magnetic head and said first actuator; and
   a frequency of a vibration generated by said bendable supporting member is cycled within a frequency range that includes a resonance frequency of said bendable supporting member while supported by said magnetic head and said first actuator in one of said width direction and said length direction.

5. A hard disk apparatus comprising:
   a magnetic disk driven to rotate and having a record surface;
   a magnetic head for recording information on and reproducing information from said record surface;
   a bendable supporting member for supporting said magnetic head at an end of said bendable supporting member;
   a first actuator that is connected to a base part of said bendable supporting member and that displaces said bendable supporting member to shift said magnetic head in a radial direction of said magnetic disk; and
   two second actuators disposed adjacently and separated by a spacing in a direction orthogonal to a length direction of said bendable supporting member and located at a position between said end and said base part of said bendable supporting member, wherein
   said second actuators expand and contract along said length direction of said bendable supporting member to shift said magnetic head minutely when said magnetic disk starts said rotation from a stopped state, and wherein one of said displacement and a vibration of said bendable supporting member in a width direction is generated by expanding one of said two second actuators and contracting an other of said two second actuators to bend said supporting member in said width direction.

6. A hard disk apparatus comprising:

a magnetic disk driven to rotate and having a record surface;

a magnetic head for recording information on and reproducing information from said record surface;

a bendable supporting member for supporting said magnetic head at an end of said bendable supporting member;

a first actuator that is connected to a base part of said bendable supporting member and that displaces said bendable supporting member to shift said magnetic head in a radial direction of said magnetic disk; and two second actuators disposed adjacently and separated by a spacing in a direction orthogonal to a length direction of said bendable supporting member and located at a position between said end and said base part of said bendable supporting member, wherein said second actuators expand and contract along said length direction of said bendable supporting member to shift said magnetic head minutely when said magnetic disk starts said rotation from a stopped state, and wherein one of said displacement and a vibration of said bendable supporting member in a thickness direction is generated by one of expanding and contracting said two second actuators simultaneously to bend said bendable supporting member in said thickness direction.

7. A hard disk apparatus comprising:

a magnetic disk driven to rotate and having a record surface;

a magnetic head for recording information on and reproducing information from said record surface;

a bendable supporting member for supporting said magnetic head at an end of said bendable supporting member;

a first actuator that is connected to a base part of said bendable supporting member and that displaces said bendable supporting member to shift said magnetic head in a radial direction of said magnetic disk; and two second actuators disposed adjacently and separated by a spacing in a direction orthogonal to a length direction of said bendable supporting member and located at a position between said end and said base part of said bendable supporting member, wherein said second actuators expand and contract along said length direction of said bendable supporting member to shift said magnetic head minutely when said magnetic disk starts said rotation from a stopped state, and wherein said bendable supporting member further comprises:

a spring part located at an intermediate position along said length direction of said bendable supporting member, said spring part being bendable in a width direction and in a thickness direction of said bendable supporting member around said intermediate position, wherein said two second actuators are located on two sides of said spring part; and bending of said bendable supporting member in said width direction and said thickness direction by said second actuators is performed around said spring part.

8. The hard disk apparatus according to claim 7, wherein said base part is connected to said first actuator and said bendable supporting member further comprises:

a front part at which said magnetic head is supported;

a narrow part connecting said base part and said front part, said narrow part having a width less than a width of said base part and said front part; and two notch parts formed on two sides of said narrow part, wherein said spring part is composed of said narrow part; and said two second actuators are located on said notch parts on two sides of said narrow part over said base part and said front part.

9. The hard disk apparatus according to claim 8, wherein said two sides of said two second actuators in an expansion and contraction direction are attached to said base part and said front part is attached to one surface of said bendable supporting member in said thickness direction.

10. The hard disk apparatus comprising:

a magnetic disk driven to rotate and having a record surface;

a magnetic head for recording information on and reproducing information from said record surface;

a bendable supporting member for supporting said magnetic head at an end of said bendable supporting member;

a first actuator that is connected to a base part of said bendable supporting member and that displaces said bendable supporting member to shift said magnetic head in a radial direction of said magnetic disk; and two second actuators disposed adjacently and separated by a spacing in a direction orthogonal to a length direction of said bendable supporting member and located at a position between said end and said base part of said bendable supporting member, wherein said second actuators expand and contract along said length direction of said bendable supporting member to shift said magnetic head minutely when said magnetic disk starts said rotation from a stopped state, and wherein said second actuators are comprised of piezoelectric devices.

11. A hard disk apparatus, comprising:

a magnetic disk;

a magnetic head for recording data to said magnetic disk and for reproducing data from said magnetic disk;

bendable support means for supporting said magnetic head;

first actuator means coupled to said bendable support means for moving said magnetic head in a radial direction of said magnetic head; and second actuator means mounted in a middle portion of said bendable support means for moving said magnetic head independently of said first actuator means, wherein said second actuator means moves said magnetic head when said magnetic disk starts to rotate from a stopped state, and wherein a space is maintained between said magnetic disk and said magnetic head by an air flow while said magnetic head is rotating, and said magnetic head is placed on said magnetic disk due to an elasticity of said bendable supporting means while said magnetic disk stops said rotation.

12. The hard disk apparatus according to claim 11, wherein said second actuator means includes a pair of actuators provided at two side portions of said bendable support means.

13. The hard disk apparatus according to claim 12, wherein said pair of actuators moves said magnetic head from said magnetic disk.

14. The hard disk apparatus according to claim 12, wherein said pair of actuators moves said magnetic head in a direction perpendicular to said radial direction of said magnetic disk.

* * * * *